C. M. DUPUY.
PROCESS OF OBTAINING WROUGHT-IRON OR STEEL DIRECT FROM THE ORE.
No. 194,340. Patented Aug. 21, 1877.
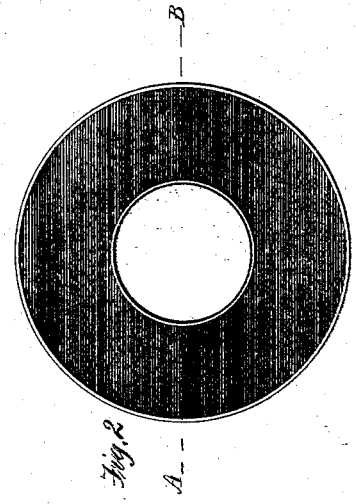
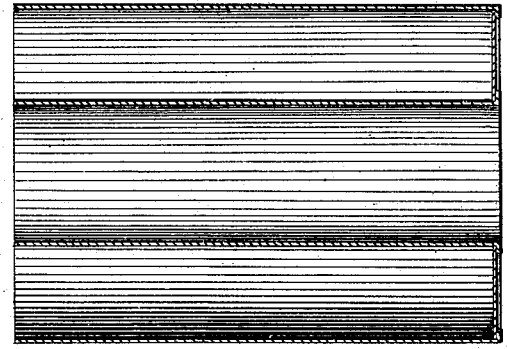
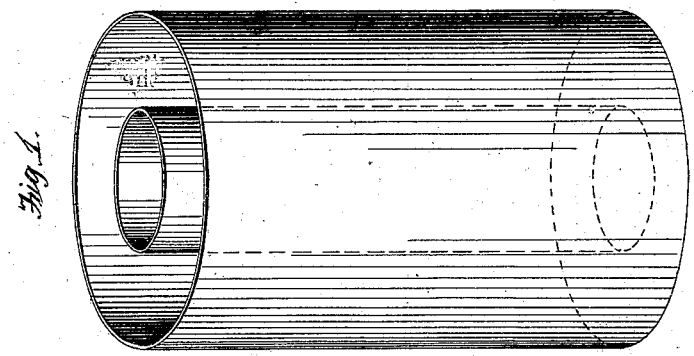
Witnesses;
Inventor

UNITED STATES PATENT OFFICE.

CHARLES M. DUPUY, OF PHILADELPHIA, PENNSYLVANIA.

IMPROVEMENT IN PROCESSES OF OBTAINING WROUGHT-IRON OR STEEL DIRECT FROM THE ORE.

Specification forming part of Letters Patent No. 194,340, dated August 21, 1877; application filed March 13, 1877.

*To all whom it may concern:*

Be it known that I, CHARLES M. DUPUY, formerly of the city of New York, in the State of New York, but now of the city of Philadelphia, in the State of Pennsylvania, have invented certain new and useful Improvements in Processes for Obtaining Direct from the Ore Wrought-Iron or Steel, which may be rolled or forged directly into sheets or bars, as desired, and of my said improvements the following is a specification:

Among numerous prior patents for processes for obtaining iron direct from the ore is one in this country granted to myself (then residing in the city of New York) under date of January 23, A. D. 1866, No. 52,149, and my present improvements appertain to the process described and specified therein, the distinguishing characteristic of said method consisting in a then novel process of charging the ores mixed with carbonaceous matter in iron canisters, reducing the contained mass and the containing canister together by heat, and subjecting the reduced mass to pressure, all as fully set forth in the specification of said Patent No. 52,149.

My present invention comprises improvements in the canisters, as well as in the treatment to which they and their contents are subjected; and consists, first, in making the canister with double walls, between which the ore and other matters are contained, and with an opening through the center, so that the heat may act upon the contents of the canister from all sides of both of the two containing-walls, instead of only from the outside of a single wall, the object of this feature of my improvements being to not only more thoroughly reduce the contents of the canister, but to economize the process by treating the contained mixture in larger masses than would otherwise be practicable.

A further feature of my improvements consists in superimposing upon the bottom of the furnace or hearth upon which the reducing process is effected a layer or bed of carbonaceous matter, the heat from which acts vertically upon the charged canisters, thus supplementing the lateral action of the heat through their walls with the reverberated heat from the roof, and securing a more perfect uniformity of the heat throughout the entire body of the contained mass in each canister, preventing the chilling of the lower section of the mass, and insuring a more homogeneous as well as a more speedy reduction of the charge than would otherwise be practicable.

A further feature of my improvements consists in mixing with the ore and carbonaceous matter to be charged in the canisters fluxing materials of certain qualities, and in certain proportions, to produce in the course of the reducing process, by combining or amalgamating with the gang, a non-flowing slag, which, permeating the mass, glazes the particles of the metal, and protects them from deleterious action, as hereinafter more specifically set forth.

In the accompanying drawings, which form part of this specification, Figure 1 is a perspective view of the double walls of my improved canister. Fig. 2 is a plan of an annulus or perforated disk, which I place between the walls of the canister to close the lower end of the space between the walls, as I place a similar one to close the upper end of this space; and Fig. 3 is a longitudinal section through the canister, showing the annular disk in place between the walls.

To make my improved canister, I take two cylinders of sheet-iron, both of equal length, but one so much smaller than the other that when the smaller is placed within the larger cylinder there is sufficient space between the two to receive the charge, as will presently be further described, while within the smaller cylinder there is an opening throughout the entire length of the canister. By preference I puncture the walls of the canister, so as to provide a series of openings through which the gases generated in the reduction of the charge may escape from the canister; but these openings are not essential.

Upon the bottom of the cylinders I form flanges which extend inward from the walls of the space between the two, and upon these flanges I place the annular sheet-iron disk, Figs. 2 and 3, which disk thus forms a bottom for the charging space in the canister, in which space it fits snugly.

I also use a similar disk above the charge, so as to form a top for the charging space in the canister; but this does not fit so snugly as the bottom disk. On the contrary, it is made to fit so loosely both around the inner cylinder and between the walls of the canister that, as the charge is reduced, the cover will follow it down, and so keep close upon the top of the charge during its treatment.

The mixture may, however, be compacted between the cylinders and charged in the furnace without having tops and bottoms to them, particularly when it is made wet, of the consistency of mortar, and afterward dried before charging into the furnace, as herein described; but I prefer to use the tops and bottoms, as described.

I have found in practice that for these canisters a good working size is from fifteen to twenty inches high, fourteen or fifteen inches outside diameter for the outer wall, and six or seven inches inside diameter for the inner wall, which will leave an opening through the middle of the canister some six or seven inches in diameter.

It being the object of my improvement in the canisters, as above described, to have the heat permeate the body of ore more equally and thoroughly than if the canister was acted upon only from the outside of a single cylinder, it is obvious that the essential feature of this part of my invention being the double walls, between which the charge is contained and the central opening through the canister, the same effect will be obtained whatever may be the shape of the canister—that is to say, the canister, instead of being cylindrical, may be polygonal or square without discarding the substance of my improvement so long as there is an opening through it to permit the charge contained between the walls to be acted upon from both sides.

The second feature of my invention may be adapted to a Siemens gas-furnace, or to any reverberatory furnace by spreading evenly upon the bottom or hearth a layer from four to twelve inches in thickness of coke, charcoal, anthracite coal, or other carbonaceous matter. When coke is used it may be made in the furnace, or the carbonaceous matter may be previously prepared and charged in and spread upon the furnace bottom or hearth, as is well understood. The bottom or hearth of the furnace should be below the bottom of the charging-doors, so that the top of the carbonaceous layer or bed may be level with the bottom of the door for facility in charging and withdrawing the canister upon and from the bed.

The third feature of my improvement relates to the mixture of ore and other matters to be charged in the canisters, these other matters consisting of pulverized carbonaceous matter and fluxing compounds, which are to be thoroughly mixed with the pulverized ore.

Generally I prefer to separate as far as desirable mechanically mixed impurities and earthy matters from the ores by washing the pulverized ore, if such impurities are contained in excess.

I deem it essential to use a greater proportion of carbonaceous matter than has been generally employed heretofore, and have found it often desirable to use as much as from twenty-five to thirty-three pounds by weight to one hundred pounds of ore. I have sometimes used a small proportion of spiegeleisen or of cast-iron borings or pieces to secure the necessary fixed carbon, which I desire to have combined chemically with the iron or steel to be produced. With the pulverized ore and the pulverized carbonaceous matter I mingle substances or ingredients which are to combine chemically with the impurities contained in the ore.

These ingredients vary with the character of the ore, but any skilled metallurgist can predetermine what materials are best, and what proportions are suitable for the particular ore to be treated. For example, I usually mingle chlorides—by preference chloride of sodium—to volatilize sulphur, and with ores containing silica I combine alkalies in such proportions as to break the affinity of the silica for the iron most perfectly; and I have discovered that when properly proportioned I thus form in minute particles a glazing or varnish, the atoms of which will remain where they are formed throughout the charge, and will not run together, or drip onto the furnace bottom to its injury.

I have found in practice that for one ton of the magnetic ore of Lake Champlain, or of the specular ore from the Republic Mine of Lake Superior, a compound of thirty-two pounds of soda, ten to twelve pounds of lime, ten to fifteen pounds of chloride of sodium, four pounds of aluminous clay, and six to ten pounds of manganese oxide not only passes off sulphur and phosphorus, but also effectually breaks the affinity of the gang for the ore, and, by uniting with it, forms a glazing material or varnish such as above indicated.

This compound, or the ingredients used for its purpose, like the ore and carbonaceous matter, must in all cases be pulverized and thoroughly mixed with the ore and carbonaceous matter; the mixture of these three elements—the ore, the carbon, and the fluxing ingredients—constituting the mass with which the canisters are to be charged.

I prefer to mix these substances together with water, so that they are charged into the canister about in the consistency of mortar, and afterward thoroughly dried before the canisters are placed in the furnace.

Having now described the three main features of my improvements, I proceed to describe the best method known to me for conducting the process by which I avail myself of the advantages rendered attainable by these preliminarily established conditions of the materials and apparatus employed; this process involving the further features of my invention, as hereinafter specified.

The annular canister being provided, and the bottom or disk being in place in each canister, the pulverized ore, carbonaceous matter, and fluxing materials being thoroughly mixed, and the furnace being ready with its bed or layer of carbonaceous matter, the mixture of ore and carbonaceous and fluxing matters is packed into the space between the walls of the canister, and the top disk is put in place above the charge. Meanwhile the furnace and its bed or layer of carbonaceous matter in the furnace have been brought to reducing (a bright yellow red) heat, and is thus ready to receive the charged canisters which are placed upon the furnace bed on end (the loose top disk or cover being uppermost) and with sufficient space around each canister to permit free access of heat on all sides of it.

The furnace thus charged with the canisters is now filled with a smoky reducing flame, which must be carefully maintained throughout the whole operation, which will usually continue for from five to seven hours. After the first half hour, or within the first hour, the heat may be gradually raised in intensity, always taking care, however, to keep the furnace full of flame.

The heat acts upon the charge laterally from both sides of the walls of the canister, and also upon the lower part of the charge, which is further supplied with heat from the carbonaceous bed, as has already been stated, and heat being also reverberated from the roof to the top of the canister, a thorough and equal reduction is thus effected, not only more speedily and economically, but with a much larger body of the mixture than could be properly treated in a single cylinder, or without the carbonaceous bed to prevent the chilling of the lower part of the charge.

The contents of the canister are first reduced by the heat, and become partially united together and to the inside of the walls of the canister, the gases generated by the chemical actions taking place in the charge escaping from the canister through the holes provided therein or out at the circumference of the top disk or cover, and becoming inflamed as they so escape.

At the end of from two to three hours, according to the condition and working of the furnace, the charges, becoming more or less pasty, will begin to sink down in the canister, (the top disk following it, as already set forth,) and the canister may then be pressed or packed with a "peel" or bar to aid in consolidating the sinking charge; but this is not essential, except as hastening the process of reduction, which will continue to advance to the fifth or to the seventh hour, according to the nature of the ore and the quality of the heat, when the gases gradually diminish in volume, and finally cease to flame from the canisters.

Then, after being exposed for a short time to a sharp welding heat, the canisters are withdrawn from the furnace and subjected to the action of a hammer, squeezer, or press, or of rolls in the usual way.

When it is desired to secure large masses of iron, I pile two, three, or more of the charged canisters either in the furnace or after their withdrawal, and while their contents are still in a pasty state, one on top of another, and subject them to compression. They may thus be stuck firmly together, and readily forged into a mass of the desired size.

Under the action of the hammer, squeezer, press, or rolls, the glazing or varnish, already described, is expressed from the canister, within which it has, during the process of reduction, been performing its function of completely separating the particles of ore from the metalloids, and enveloping those particles of metal so as to protect them from the oxidizing effect of the furnace gases.

The practical value of this feature of my invention can scarcely be overestimated, as aside from the saving effected by its protecting the furnace bottom from the cutting action of the fluxes, and thus reducing the cost of the ordinary furnace repairs, it insures a larger yield of metal from the ore than has ever before been obtained by any direct process on a practical working scale, and this increased yield is also of most superior quality.

I attribute another great advantage to this feature of my invention, to wit: It eliminates phosphorus at the moderate heat maintained throughout nearly the whole reducing operation, during which period it (the phosphorus) leaves the iron to combine with the glassy substance or varnish, and with this glazing or varnish passes off under the hammer, press, squeezer, or rolls.

To produce steel or semi-steel I have only to raise the percentage of carbon in the mixture for charging the canister.

With this process I obtain as my improved product in each canister a mass of iron comprising the largest percentage from the ore that has ever before been produced by any direct process on a working scale. It is freed more perfectly than heretofore has been practicable from all impurities, and the original envelope becomes incorporated with the mass, forming therewith a homogeneous metal of superior quality in the respects already specified.

It is to be understood that while I have described my improved process as practiced by me in its best form, I do not confine myself in all particulars to the details specified. For instance, the canisters, instead of being charged onto a bed or layer of carbonaceous matter, may be charged directly upon the bottom of the furnace, or they may be supported above the bottom of the furnace. They may be placed upon a sand bottom or upon firebrick placed close together or separated or forming shelves; but such departures from the best practice, while still within the scope of my invention, will not give the fullest advantages thereof, especially in respect to the protection of the furnace bottom from the action of the fluxes.

It is also manifest that the carbonaceous layer or bed of the furnace will be of great advantage even when the canisters are not provided with an opening through the middle.

Having thus described the nature and objects of my improvements, what I claim herein as new, and desire to secure by Letters Patent, is—

1. The improved method of obtaining wrought-iron or steel direct from the ore, which consists in reducing the mixed and pulverized ore-flux and carbon in sheet-iron annular cases, which cases are finally incorporated with the reduced metal and form a part of the finished bloom, as herein described.

2. The described process of producing wrought-iron direct from the ore, which consists in charging onto a furnace-hearth sheet-iron annular canisters filled with a pulverized mixture of iron ore, carbon, and flux, and subjecting them therein to a gradually-increasing temperature until the reduction of the contained ore is perfected, the furnace-flame being maintained throughout the operation of a reducing quality, and the resulting mass of metal withdrawn and shingled, all substantially as herein set forth.

3. The method of promoting the speedy reduction of the ore, which consists in spreading a carbonaceous layer upon the furnace-hearth, and charging the annular canisters containing the mixed materials therein, substantially as herein described.

4. The process of preventing the destructive oxidizing action of the furnace-gases upon the reducing metal, which consists in mixing with the ore such quality and proportion of fluxing material as will form with the gang a non-flowing slag, which slag, remaining where it is formed throughout the mass, effectually glazes and protects the metal from deleterious action, as herein described.

CHARLES M. DUPUY.

Witnesses:
JNO. J. DARBY,
B. M. GRIGGS.